(12) United States Patent
Xiong et al.

(10) Patent No.: US 10,503,749 B2
(45) Date of Patent: Dec. 10, 2019

(54) DATA PROCESSING METHOD, DEVICE AND SYSTEM OF QUERY SERVER

(71) Applicant: UBTECH Robotics Corp., Shenzhen (CN)

(72) Inventors: Youjun Xiong, Shenzhen (CN); Liangliang Jia, Shenzhen (CN); Desen Su, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 248 days.

(21) Appl. No.: 15/632,405

(22) Filed: Jun. 26, 2017

(65) Prior Publication Data

US 2018/0189366 A1 Jul. 5, 2018

(30) Foreign Application Priority Data

Dec. 29, 2016 (CN) .......................... 2016 1 1242024

(51) Int. Cl.
*G06F 16/25* (2019.01)
*G06F 16/31* (2019.01)
*G06F 16/2455* (2019.01)

(52) U.S. Cl.
CPC ...... *G06F 16/254* (2019.01); *G06F 16/24554* (2019.01); *G06F 16/319* (2019.01)

(58) Field of Classification Search
CPC .......................... G06F 16/254; G06F 16/24554
See application file for complete search history.

(56) References Cited

U.S. PATENT DOCUMENTS

| | | | | |
|---|---|---|---|---|
| 2001/0039585 | A1* | 11/2001 | Primak | H04L 29/12066 709/228 |
| 2006/0059152 | A1* | 3/2006 | Nakamura | G06F 16/955 |
| 2008/0114730 | A1* | 5/2008 | Larimore | G06F 16/3325 |
| 2009/0100014 | A1* | 4/2009 | Gedik | G06F 16/3332 |
| 2009/0228528 | A1* | 9/2009 | Ercegovac | G06F 16/319 |
| 2012/0215765 | A1* | 8/2012 | Sercinoglu | G06Q 30/02 707/721 |
| 2015/0039587 | A1* | 2/2015 | Liu | G06F 16/8365 707/718 |

* cited by examiner

*Primary Examiner* — Hosain T Alam
*Assistant Examiner* — Anthony G Gemignani

(57) ABSTRACT

A data processing system comprises a loading server and a query server. The loading server is configured to extract updated data from at least two table databases and insert the updated data into the query server. The query server is configured to create an inverted index for querying the updated data, and the inverted index is indexed to an index table of the query server.

15 Claims, 4 Drawing Sheets

DATA PROCESSING METHOD, DEVICE AND SYSTEM OF QUERY SERVER

CROSS REFERENCE TO RELATED APPLICATIONS

This application claims priority to Chinese Patent Application No. 201611242024.3, filed Dec. 29, 2016, which is hereby incorporated by reference herein as if set forth in its entirety.

BACKGROUND

1. Technical Field

The present disclosure generally relates to database technology, and particularly to a data processing method, device, and system of a query server.

2. Description of Related Art

When a large amount of data is stored in a relational database, the large amount of data is divided into different tables and databases according to a predetermined rule. However, query efficiency is low with different tables and databases, and particularly to a combination query with a complex condition.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
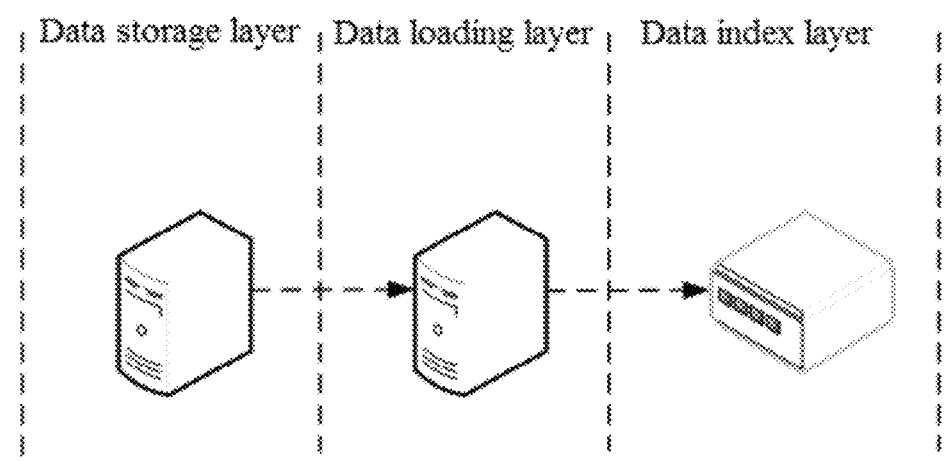
FIG. 1 is a block diagram of a data processing system according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIG. 1 shows a data processing system according to one embodiment.

The data processing system can include a data storage layer, a data loading layer, and a data index layer. The data storage layer can include a storage server to store at least two table databases. The data loading layer can include a loading server to extract and update a data from the table databases, and the loading server can insert the data index layer to the data in the at least two table databases. The data index layer can include a query server to create an inverted index for data query of updated data.

Figure 2:
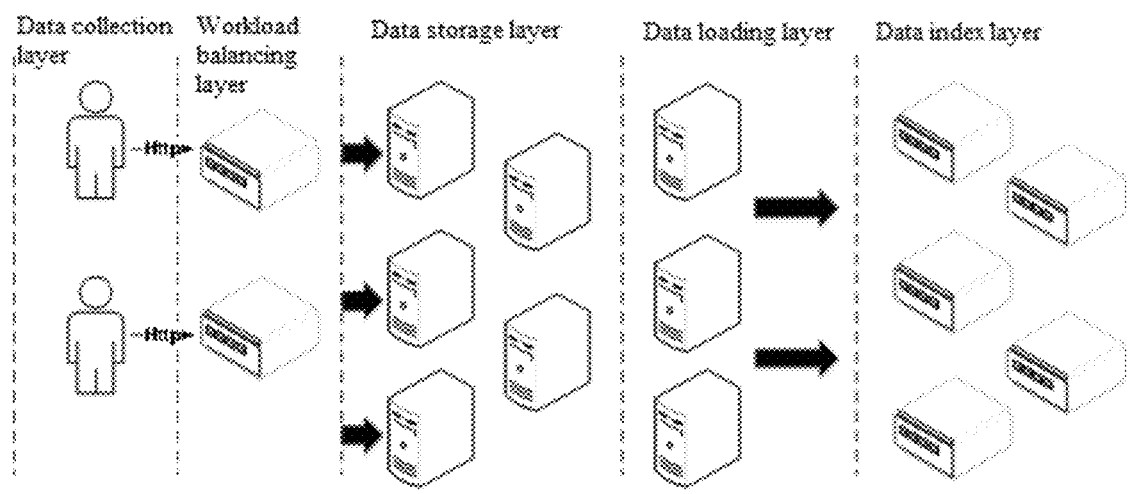
FIG. 2 is a block diagram of a data processing system according to another embodiment.

FIG. 2 shows a data processing system according to another embodiment. Compared with the data processing system of FIG. 1, the data processing system can further include a data collection layer and a workload balancing layer.

The data collection layer can include a terminal to collect data. The workload balancing server can include at least two workload balancing servers. In the embodiment, the workload balancing server can be performed by Nginx, and Keeplived of Nginx can perform state detection and select one server in the normal state.

The data storage layer can include a storage server cluster, which can include at least two storage servers. The workload balancing server can select which storage server to store the collected data. The storage server can store the data in different rules. The data can be stored according to a time rule, such as, the data of different dates are stored in different storage servers. In another embodiment, the data can be stored according to a location rule, such as, the data of different regions are stored in different storage servers.

The data loading layer can include a loading server cluster, which can include at least two loading servers. Each loading server can extract updated data from the at least two table databases of the storage server according to a predetermined extracting rule.

In one embodiment, the predetermined rule can be configured to extract the updated data corresponding to storage time. The data loading layer can include three loading servers 1, 2, and 3. The loading server 1 can extract the data stored on Dec. 25, 2016, the loading server 2 can extract the data stored on Dec. 26, 2016, and the loading server 3 can extract the data stored on Dec. 27, 2016. And in a next extraction process, the loading server 1 can extract the data stored on Dec. 28, 2016, the loading server 2 can extract the data stored on Dec. 29, 2016, and the loading server 3 can extract the data stored on Dec. 30, 2016. Each extraction is performed as described-above manner. In the extraction manner, three loading servers can extract the updated data every three days.

In another embodiment, the loading server can be configured to extract the updated data corresponding to location. The data loading layer can include three loading servers 1, 2, and 3. The loading server 1 can extract the data from Beijing, the loading server 2 can extract the data from Shanghai, and the loading server 3 can extract the data from Hangzhou. In the extraction manner, an extraction time of the loading server can be set, e.g., to extract the updated data every twelve hours.

In another embodiment, the loading server can be configured to extract the updated data corresponding to classification rule. The data loading layer can include three loading servers 1, 2, and 3. The loading server 1 can extract identification data, the loading server 2 can extract communication data, and the loading server 3 can extract bank account data. In the extraction manner, an extraction time of the loading server can be set, e.g., to extract the updated data every twelve hours.

The extracting method of the updated data for the loading server is not limited to a storage rule of the storage server.

Each loading server can extract the updated data from at least one storage server regardless of the storage rule of the storage server.

The data index layer can include a query server cluster, which can include at least two query servers. There is no a primary and secondary nodes in the at least two query servers. Workload balancing is performed in the data index layer by following steps.

In the data processing system of FIG. 2, the data storage layer, the data loading layer, and the data index layer can dynamically expand nodes, which is beneficial to extend the concurrent ability of the system and improve data query efficiency.

Figure 3:
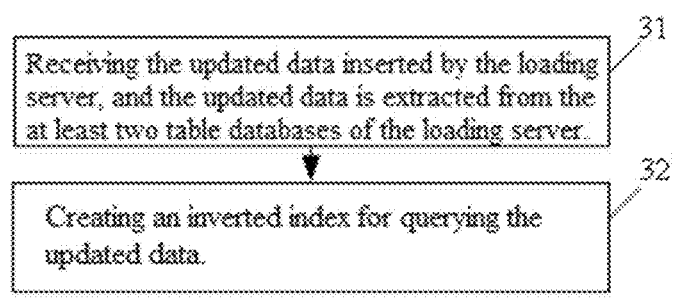
FIG. 3 is a flowchart of a data processing method of a query server according to one embodiment.

FIG. 3 shows a flowchart of the data processing method of the query server according to one embodiment. The data processing method is performed by the query server of FIG. 1.

In step 31, receiving the updated data inserted by the loading server. And the updated data is extracted from the at least two table databases of the loading server.

In step 32, creating an inverted index for querying the updated data.

In the data processing method of FIG. 3, the loading server can extract the updated data from the two table databases and insert the updated data to the query server, which is equivalent to reconstruct the data from different table and databases to one table. Thus, it is easy to perform a combination query under complex conditions. In other hand, the query server creates the inverted index for the updated data, the data query efficiency is improved.

Figure 4:
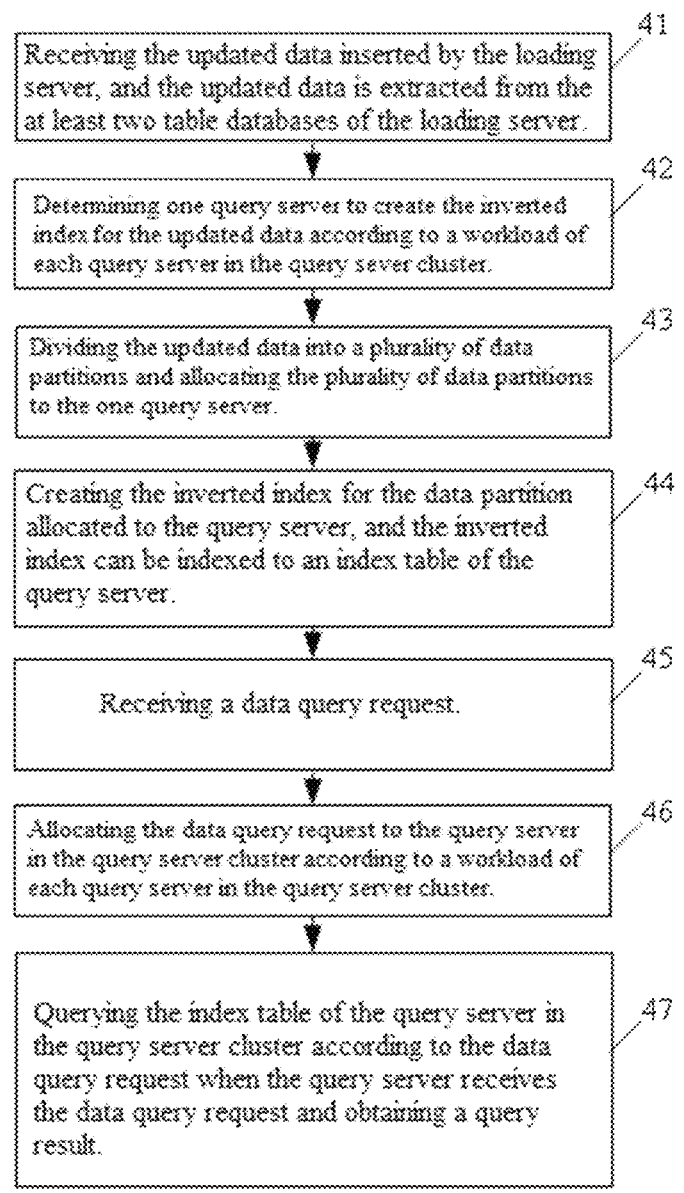
FIG. 4 is a flowchart of a data processing method of a query server according to another embodiment.

FIG. 4 shows a flowchart of a data processing method of the query server according to another embodiment. The data processing method is performed by the query server of FIG. 2.

In step 41, receiving the updated data inserted by the loading server. And the updated data is extracted from the at least two table databases of the loading server.

In an alternative embodiment, receiving the updated data from at least two loading servers. Each loading server can extract respective updated data from the at least two table databases according to a predetermined extraction rule. The predetermined extraction rule can be consistent with FIG. 2.

In step 42, determining one query server to create the inverted index for the updated data according to a workload of each query server in the query server cluster.

In an alternative embodiment, each query server has a weight; the query server has a larger weight corresponding to a lighter workload. A weight threshold is set, and the query server with a larger weight than the weight threshold is selected as the one query server to create the inverted index for the updated date.

In step 43, dividing the updated data into a plurality of data partitions and allocating the plurality of data partitions to the one query server.

In an alternative embodiment, each of the plurality of data partitions can have different size. The query server with a larger weight can deal with more data, and more data partitions can be allocated to the query server with the larger weight.

In step 44, creating the inverted index for the data partition allocated to the query server, and the inverted index can be indexed to an index table of the query server.

As there is no the primary and secondary nodes for the at least two query servers, the data partitions allocated to the query server can be allocated by itself or by other query servers. The data partitions allocated to the query server can be allocated by itself and by other query servers. The query server can create the inverted index for the data partitions, and the inverted index is indexed to the index table.

In the embodiment, the query server create the inverted index for the data partitions in an ordinary manner, such as, the data partition is analyzed by a tokenizer and indexed to the index table of the query server.

In order to improve a success rate of creating the inverted index and protect the data query operation, an error reporting mechanism is implemented in the data processing system. When the query server determines that a creation of the inverted index is failed according to the predetermined rule, if the data partition corresponding to the failed inverted index is allocated by itself, a message denoting that the inverted index is failed to create is sent to the loading server which is configured to insert the data partition with failed inverted index; if the data partition corresponding to the failed inverted index is allocated by other query server, a message denoting that the inverted index is failed to create is sent to the query server which allocates the data partition, and the query server which allocates the data partition transfers the message to the loading server. The message includes an identification of the data partition with failed inverted index. When the loading server receives the message, the loading server re-sends the data partition corresponding to failed inverted index. The query server re-creates the inverted index for the data partition with failed inverted index and indexes the inverted index to the index table. In the embodiment, the predetermined rule can be a time delay, such as when the inverted index is created for more than 30 seconds, a creation of the inverted index is determined to be failed.

The inverted index is created for data query for the updated data inserted to the loading server via the steps 41 to 44. The query server can also configure to perform data query and a combination query under complex conditions according to the inverted index.

In step 45, receiving a data query request.

The query server can directly communicate with a terminal (not shown in FIG. 2) which sends the data query request, the data query request can include an identification of the terminal.

In step 46, allocating the data query request to the query server in the query server cluster according to a workload of each query server in the query server cluster.

Any one query server can receive the data query request and then allocate the data query request to the query server in the query server cluster according to the workload balancing rule. When the data query request is allocated, the identification of the terminal sent the data query request should be simultaneously sent. The data query request can be allocated to the query server which receives the query server, also can be allocated to other query servers according the workload balancing rule.

In step 47, querying the index table of the query server in the query server cluster according to the data query request when the query server receives the data query request and obtaining a query result. The data query request allocated to the query server is responded according to the query result.

As each query server in the data index layer include the index table, the query server dealing with the data query request not only queries the index table itself, but also queries the index table of the other query servers in the query server cluster and directly give a response to the terminal which send the data query request.

Figure 5:
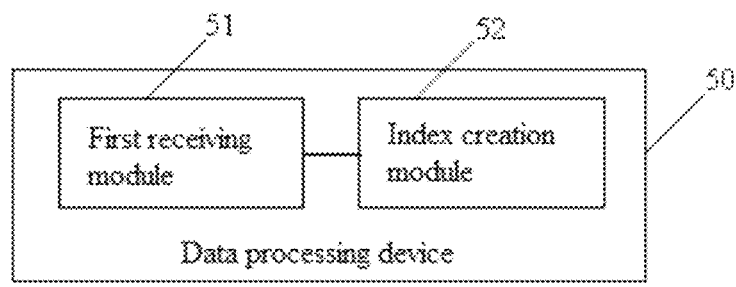
FIG. 5 is block diagram of a data processing device 50 of a query server according to one embodiment.

FIG. 5 shows a data processing device of the query server according to one embodiment. The data processing device 50 can include a first receiving module 51 and an index creation module 52.

The first receiving module 51 is configured to receive the updated data inserted by the loading server. And the updated data is extracted from the at least two table databases of the loading server.

The index creation module 52 is configured to create an inverted index for querying the updated data. As shown in FIG. 5, the loading server can extract the updated data from the two table databases and insert the updated data to the query server, which is equivalent to reconstruct the data from different table and databases to one table. Thus, it is easy to perform a combination query under complex conditions. In other hand, the query server creates the inverted index for the updated data; the data query efficiency is improved.

Figure 6:
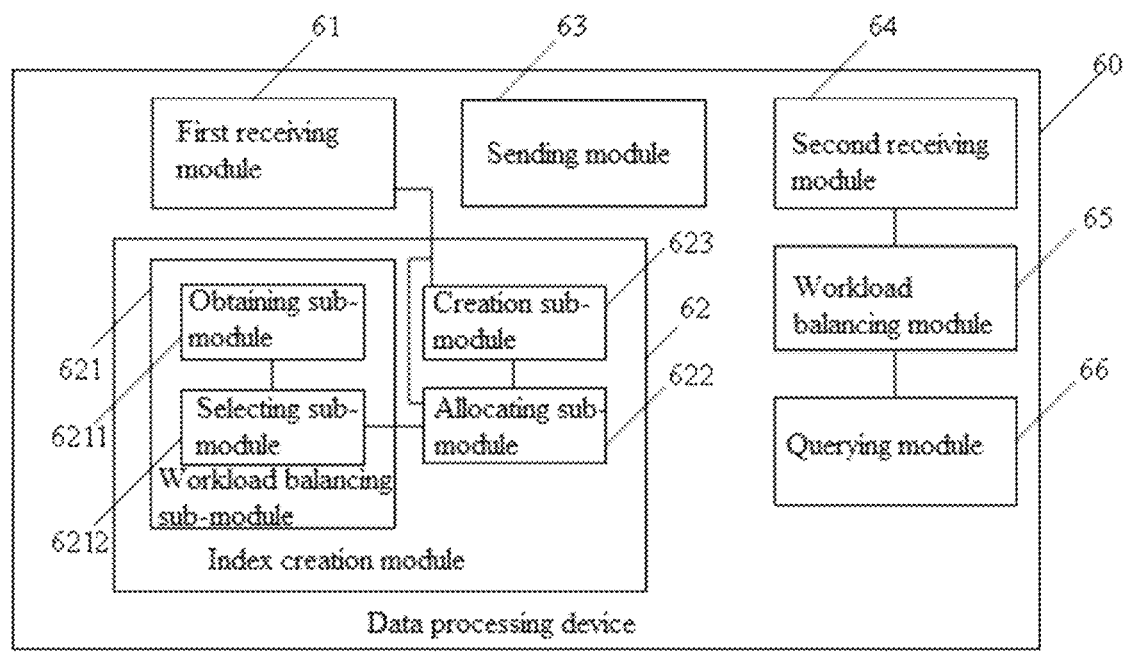
FIG. 6 is block diagram of a data processing device 60 of a query server according to one embodiment.

FIG. 6 shows a data processing device of a query server according to another embodiment. The data processing device 60 can include a first receiving module 61, an index creation module 62, a sending module 63, a second receiving module 64, a workload balancing module 65, and a querying module 66.

The first receiving module 61 is configured to receive the updated data inserted by the loading server. And the updated data is extracted from the at least two table databases of the loading server. In an alternative embodiment, the first receiving module 61 can receive the updated data from at least two loading servers. Each loading server can extract respective updated data from the at least two table databases according to a predetermined extraction rule.

The index creation module 62 can include a workload balancing sub-module 621, an allocating sub-module 622, and a creation sub-module 623.

The workload balancing sub-module 621 is configured to determine one query server to create an inverted index for the updated data according to a workload of each query server in the query sever cluster.

In an alternative embodiment, the workload balancing sub-module 621 can include an obtaining sub-module 6211 and a selecting sub-module 6212.

The obtaining sub-module 6211 is configured to obtain a weight of each query server, which has a larger weight corresponding to a lighter workload.

The selecting sub-module 6212 is configured to select one query server having a larger weight than a weight threshold to create the inverted index.

The allocating sub-module 622 is configured to divide the updated data into a plurality of data partitions and allocating the plurality of data partitions to the one query server.

The creation sub-module 623 is configured to create an inverted index for the data partition allocated to the query server, and the inverted index is indexed to an index table of the query server.

The first receiving module 61 is further configured to receive the data partition allocated by other query servers in the query server cluster.

The data partition is allocated to the query server by itself can include the data partition allocated by the allocating sub-module 622, and/or the data partition allocated by the other query servers in the query server cluster.

When the query server determines that a creation of the inverted index is failed according to the predetermined rule, if the data partition corresponding to the failed inverted index is allocated by itself, the sending module 63 is configured to send a message denoting that the inverted index is failed to create to the loading server which is configured to insert the date partition with failed inverted index; if the data partition corresponding to the failed inverted index is allocated by other query server, the sending module 63 is configured to send a message denoting the inverted index is failed to create is sent to the query server which allocates the data partition, and the query server which allocates the data partition transfers the message to the loading server. The message includes an identification of the data partition with failed inverted index. The first receiving module 61 is further configured to receive the data partition with failed inverted index and the trigger the creation sub-module 623.

The second receiving module 64 is configured to receive the data query request and allocate the data query request to the query server in the query server cluster according to a workload of each query server in the query server cluster.

The querying module 66 is configured to query the index table of the query server in the query server cluster according to the data query request when the query server receives the data query request. The data query request allocated to the query server is responded according to a query result.

In an alternative embodiment, the data processing device of the query server can include a processor and a memory, the memory is configured to store one or more executable instructions, when the processor reads the instructions, and the data processing method can be performed.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A data processing method, comprising:
providing a data processing system comprising a storage server, a loading server, and a query server cluster, wherein the loading server is electronically coupled to the storage server and the query server cluster;
extracting, by the loading server, updated data from at least two table databases stored in the storage server,
receiving, by a query server of the query server cluster, the updated data inserted by the loading server, and determining one query server to create the inverted index for the updated data according to a workload of each query server in the query server cluster,
dividing, by the query server, the updated data into a plurality of data partitions and allocating the plurality of data partitions to the one query server;
in response to the plurality of data partitions being allocated to the query server by itself, creating, by the query server, an inverted index for the plurality of data partitions, wherein the inverted index is indexed to an index table of the query server, and the plurality of data partitions allocated to, the query server is allocated by itself and/or by other query servers in the query server cluster;
determining, by the query server, whether a creation of the inverted index is failed, in response to the creation of the inverted index being failed, if the plurality of data partitions corresponding to the failed inverted index is allocated by itself, sending, by the query server, a message denoting that the inverted index is failed to create to the loading server which is configured to insert the plurality of data partitions with failed inverted index; and if the plurality of data partitions corresponding to the failed inverted index is allocated by other query server, sending, by the query server, a message denoting that the inverted index is failed to create to the query server which allocates the plurality of data partitions, wherein the query server which allocates the plurality of data partitions transfers the message to the loading server, and the message comprises an identification of the plurality of data partitions with failed inverted index; and receiving, by the query server, the plurality of data partitions corresponding to the flailed inverted index, and creating the inverted index for the plurality of data partitions corresponding to the failed inverted index, wherein the inverted index is indexed to the index table.

2. The data processing method of claim 1, wherein determining one query server to create the inverted index for the updated data according to a workload of each query server in the query server cluster comprises:

obtaining a weight of each query server, which has a larger weight corresponding to a lighter workload; and selecting one query server having a large weight than a weight threshold to create the inverted index.

3. The data processing method of claim 1, further comprising:

receiving, by the query server, a data query request;

allocating the data query request to the query server in the query server cluster according to a workload of each query server in the query server cluster, querying the index table of the query server in the query server cluster according to the data query request when the query server receives the data query request; and responding to the data query request according to a query result.

4. The data processing method of claim 1, wherein receiving, by the query server, the updated data inserted by the loading server comprises:

receiving, by the query server, the updated data inserted by at least two loading servers, wherein each loading server is configured for extracting the updated data from the at least two table databases according to a predetermined extracting rule.

5. The data processing method of claim 4, wherein the predetermined extracting rule is selected from at least one of the group:

extracting the updated data corresponding to a storage time;

extracting the updated data corresponding to a location; and extraction the updated data corresponding to a classification.

6. A data processing device, comprising a storage and a processor, wherein the processor is electronically coupled to a loading server, the storage comprises instructions that are executable by the processor, and the instructions comprises a first receiving module, an index creation module, and sending module;

wherein the first receiving module is configured for receiving updated data inserted by the loading server, and the updated data is extracted from at least two table databases stored in a storage server electronically coupled to the loading server, wherein the index creation module is configured for creating an inverted index for querying the updated data, and the inverted index is indexed to an index table of the query server;

wherein the index creation module comprises:

a workload balancing sub-module, configured for determining one query server to create the inverted index for the updated data according to a workload of each query server in a query server cluster;

an allocating sub-module, configured for dividing the updated data into a plurality of data partitions and allocating the plurality of data partitions to the one query server; and a creation sub-module, configured for creating the inverted index for the plurality of data partitions allocated to the query server, and the inverted index is indexed to an index table of the query server;

wherein the first receiving module is further configured for receiving the plurality of data partitions allocated by the other query servers in the query server cluster, and the plurality of data partitions allocated to the query server is allocated by itself and/or by other query servers in the query server cluster;

wherein in response to the query server determines that a creation of the inverted index being failed according to the predetermined rule, if the plurality of data partitions corresponding to the failed inverted index is allocated by itself, the sending module is configured for sending a message denoting that the inverted index is failed to create to the loading server which is configured to insert the plurality of data partitions with failed inverted index, and if the plurality of data partitions corresponding to the failed inverted index is allocated by other query server, the sending module is further configured for sending a message denoting that the inverted index is flailed to create to the query server which allocates the plurality of data partitions, and the message comprises an identification of the plurality of data partitions with failed inverted index;

the first receiving module, is further configured for receiving the plurality of data partitions corresponding to the failed inverted index, and triggering the creation sub-module to create the inverted index for the plurality of data partitions corresponding to the flailed inverted index.

7. The data processing device of claim 6, wherein the workload balancing sub-module comprises:

an obtaining sub-module, configured for obtaining a weight of each query server, which has a larger weight corresponding to a lighter workload;

a selecting sub-module, configured for selecting one query server having a large weight than a weight threshold to create the inverted index.

8. The data processing device of claim 6, further comprising:

a second receiving module, configured for receiving a data query request and allocating the data query request to the query server in the query server cluster according to a workload of each query server in the query server cluster; and a query module querying, configured for the index table of the query server in the query server cluster according to the data query request when the query server receives the data query request, and the data query request is responded by a query result.

9. The data processing device of claim 6, wherein the first receiving module is further configured for receiving the updated data inserted by at least two loading servers, wherein each loading server is configured for extracting the updated data from the at least two table databases according to a predetermined extracting rule.

10. The data processing device of claim 9, wherein the predetermined extracting rule is selected from at least one of the group:
  extracting the updated data corresponding to a storage time;
  extracting the updated data corresponding to a location; and
  extracting the updated data corresponding to a classification.

11. At data processing system, comprising:
  a storage server, a loading server, and a query server cluster, wherein the loading server is electronically coupled to the storage server and the query server cluster,
  wherein the storage server is configured for storing at least two table databases;
  the loading server, is configured for extracting updated data from at least two table databases stored in the storage server, and inserting the updated data into the query server;
  a query server of the query server cluster, is configured for:
  receiving the updated data inserted by the loading server, and determining one query server to create the inverted index for the updated data according to a workload of each query server in the query server cluster;
  dividing the updated data into a plurality of data partitions, and allocating the plurality of data partitions to the one query server;
  in response to the plurality of data partitions being allocated to the query server by itself, creating an inverted index for the plurality of data partitions, wherein the inverted index is indexed to an index table of the query server, and the plurality of data partitions allocated to the query server is allocated by itself and/or by other query servers in the query server;
  determining whether a creation of the inverted index is failed;
  in response to the creation of the inverted index being failed, if the plurality of data partitions corresponding to the failed inverted index is allocated by itself, sending a message denoting that the inverted index is failed to create to the loading server which is configured to insert the plurality of data partitions with failed inverted index, and if the plurality of data partitions corresponding to the flailed inverted index is allocated by other query server a message denoting that the inverted index is failed to create to the query server which allocates the plurality of data partitions, wherein the query server which allocates the plurality of data partitions transfers the message to the loading server, and the message comprises an identification of the plurality of data partitions with failed inverted index; and
  receiving the plurality of data partitions corresponding to the filed inverted index, and creating the inverted index for the plurality of data partitions corresponding to the failed inverted index, wherein the inverted index is indexed to the index table.

12. The data processing system of claim 11, wherein the query server is further configured for:
  obtaining a weight of each query server, which has a larger weight corresponding to a lighter workload; and
  selecting one query server having a large weight than a weight threshold to create the inverted index.

13. The data processing system of claim 11, wherein the query server is further configured for:
  receiving a data query request;
  allocating the data query request to the query server in the query server cluster according to a workload of each query server in the query server cluster,
  querying the index table of the query server in the query server cluster according to the data query request when the query server receives the data query request; and
  responding to the data query request according to a query result.

14. The data processing system of claim 11, wherein the query server is further configured for receiving the updated data inserted by at least two loading servers, and each loading server is configured for extracting the updated data from the at least two table databases according to a predetermined extracting rule.

15. The data processing system of claim 14, wherein the predetermined extracting rule is selected from at least one of the group:
  extracting the updated data corresponding to a storage time;
  extracting the updated data corresponding to a location; and
  extracting the updated data corresponding to a classification.

* * * * *